United States Patent [19]

Oelmann et al.

[11] 3,978,019

[45] Aug. 31, 1976

[54] PROCESS FOR PRODUCTION OF DEEP COLORED SMALL PARTICLE SIZE GAS BLACK WITH LOW CONTENT OF EXTRACTABLE MATTER

[75] Inventors: Alfred Oelmann; Claus Richard Engel, both of Bruhl; Lothar Rothbuhr, Hermuhlheim, all of Germany

[73] Assignee: Deutsche Gold- und Silber-Scheideanstalt vormals Roessler, Germany

[22] Filed: Jan. 28, 1975

[21] Appl. No.: 544,771

[30] Foreign Application Priority Data

Jan. 31, 1974 Germany............................ 2404536

[52] U.S. Cl................................ 260/42.2; 423/450; 423/452; 106/307; 260/42.44; 260/42.19
[51] Int. Cl.²........................................... C09C 1/48
[58] Field of Search ............ 106/307, 309; 423/450, 423/452; 260/42.19, 42.21, 42.44

[56] References Cited
UNITED STATES PATENTS

| | | | |
|---|---|---|---|
| 1,811,854 | 6/1931 | Lewis | 423/452 |
| 2,665,194 | 1/1954 | Jordan | 423/452 |

*Primary Examiner*—Patrick P. Garvin
*Assistant Examiner*—J. V. Howard
*Attorney, Agent, or Firm*—Cushman, Darby & Cushman

[57] ABSTRACT

Deeply colored carbon black having a low content of extractable matter and a primary particle size of about 8–25 nanometers is made by the gas black process using as the carrier gas for the vapors of the carbon black forming oil a hydrogen rich mixture containing over about 50 volume % hydrogen and then collecting the separated carbon black deposited on a cooling roll.

10 Claims, No Drawings

PROCESS FOR PRODUCTION OF DEEP COLORED SMALL PARTICLE SIZE GAS BLACK WITH LOW CONTENT OF EXTRACTABLE MATTER

The invention is directed to a process for the production of deeply colored carbon black with low content of extractable matter and primary particle sizes of about 8–25 nanometers (nm) by the gas black process.

The most important processes for the production of carbon black are the furnace process, the channel-gas black process, the lamp black process and the thermal black process. The greatest part of the world carbon black production today is made by the furnace process. However it has not yet been possible to successfully produce by this process especially finely divided and especially deep colored carbon black, as is required for synthetic resins and other binders. As present for this purpose the channel black process and the gas black process are still of great importance. In contrast to the furnace black process, which is carried out in a closed reactor, in the channel process small, flat natural gas flames burn in open air against U-shaped iron, from which the carbon black is scraped off. Also in the gas black process small flames burn (which flames are charged with coke-oven gas and tar oil vapor) against cooled rotating rolls with free introduction of air. The predominant portion of the carbon black separates on the cooled rolls and is scraped off, the remainder is recovered in filters.

The channel process from the beginning has been operated only in the USA. Through increasing natural gas prices and provisions for maintaining air cleanliness it has practically been abandoned so that there has arisen world-wide a considerable demand for finely divided gas blacks for use in the synthetic resin and varnish formulations. In order to more closely define this class of carbon black it concerns a carbon black having a primary particle size of 80–250 A (8–25 nm) which based on their production in an air atmosphere have a pH value less than 7, preferably smaller than 5. The process of production employed is described in outline in Ullmann Enzyklopaedie der technischen Chemie Vol. 14, pages 798–799 and in Kloepfer et al., German Pat. Nos. 724,740 and 742,663; Wagner German Pat. No. 845,683 and Haas German Pat. No. 841,316. The entire disclosure of the four German patents is hereby incorporated by reference.

The depth of color which a color black can impart to polymer systems such as for example synthetic resins depends above all (except for the surface properties) on the primary particle size of the carbon black. The more finely divided the black the blacker can the binder system be colored. While the entire color intensity palette of the channel blacks can easily be covered and replaced by gas blacks, they have the disadvantage that gas blacks have a higher extract content than the corresponding channel blacks because of the different starting raw materials. While channel blacks in the given primary particle size range contain between 0.008 and 0.080 weight % extractable constituents, gas blacks frequently can be considerably over these levels.

The provisions of the German Synthetic Resin Commission specify for carbon blacks which are to be added to synthetic resins for food uses, extractable contents below 0.150 weight %. In France for this type of black the extractable content is specified as below 0.100%. It is possible to reduce the extractable content directly during the process of the production or also through the subsequent treatment of the extract rich carbon black. The problem to be solved is the development of a method for working out the production of finely divided gas black with an extractable content below 0.100% in one process step without subsequent treatment.

A surprising solution to this problem has been attained by using as a carrier gas for the vapor of carbon black forming oil a hydrogen rich mixture containing over 50 volume % of hydrogen and then collecting the carbon black separated on a cooling roll.

A preferred form of the invention employs a carrier gas containing over 70 volume % of hydrogen. The hydrogen content can be as high as 100% of the carrier gas.

The balance of the carrier gas can include conventional materials such as one or more of methane, ethane, acetylene, ethylene, $C_3$ hydrocarbon fraction (including less volatile constituents), nitrogen, carbon monoxide and carbon dioxide.

The invention is directed to both the gas blacks obtained by the described process having an extractable content below 0.100 weight % as well as the use of such blacks for pigmentation of polymers of all types, especially in the food sector, for example packaging, conveying or transportation of food. Thus the blacks can be used with vinyl chloride resins, e.g., polyvinyl chloride and vinyl chloride-vinyl acetate copolymer, polyethylene, polypropylene, ethylene-propylene copolymers, natural rubber, synthetic rubber, e.g. butadiene styrene copolymer, etc.

The details of the process of the invention will be further explained in several examples. Below there is described the composition of the raw material used and the type of testing methods.

A. RUSSOEL (CARBON BLACK FORMING OIL)

As has already been described in contrast to the channel process the so-called "russoel" is the main carbon provider for the carbon black formed. For the experiments there was used a coal tar oil having the following characteristics.

| Density | 1.094 g/ml at 20°C |
|---|---|
| Distillation Residue | 1.9 g/100 ml of oil |

Boiling Analysis

5% distills over at 243°C
10% distills over at 249°C
20% distills over at 261°C
30% distills over at 274°C
40% distills over at 293°C
50% distills over at 308°C
60% distills over at 320°C
70% distills over at 336°C
80% distills over at 353°C
90% distills over at 376°C
96% distills over at 400°C Gas chromatographic analysis of the ring system weight % based on the vaporizable material:

| 1-ring aromatics | 1.70% |
|---|---|
| 2-ring aromatics | 32.40% |

-continued

| | |
|---|---|
| 3-ring aromatics | 48.85% |
| 4-ring aromatics | 16.79% |

B. CARRIER GAS

The important roll of the carrier gas for the gas black process has already been mentioned. There were used gases of the following composition (in Volume %):

| | CARRIER GAS 1 | CARRIER GAS 2 | CARRIER GAS 3 |
|---|---|---|---|
| Hydrogen | 48.0 | 59.3 | 85.0 |
| Methane | 25.5 | 25.8 | 13.5 |
| Acetylene, ethane | — | 0.4 | 1.0 |
| $C_3$-fraction (plus higher boiling hydrocarbons) | 2.2 | 0.7 | 0.2 |
| Nitrogen | 9.4 | — | — |
| Carbon Monoxide | 7.1 | 3.8 | 0.3 |
| Carbon Dioxide | 7.3 | 9.9 | — |

C. DETERMINATION OF THE OIL ABSORPTION 0.5 of carbon black was made into a paste with linseed oil varnish (RAL 848B) using a spatula. The oil flowed from a 2 ml burette and the paste formation continued until a "standing paste" was attained, i.e. up to the flow point. This point is reached when upon raising the spatula cone shaped peaks which do not immediately collapse are drawn out of the paste. The "oil absorption" (or "oil demand") is given in weight percent.

D. DETERMINATION OF BLACKNESS VALUE 0.1 gram of carbon black is mixed with linseed oil varnish (RAL 848B) on a glass plate until a standing paste is formed.
This paste is spread out on a slide and compared with a paste of known blackness value in the light of a focussed clear Leitz lamp. Higher blackness values correspond to a blacker carbon black.

E. EXTRACTABLE CONTENT

The extractable content was determined according to DIN (German Industrial Standard) 53,533, Point 7.3. The extraction agent was toluene, the weight was 10 grams, the time of extraction, 8 hours.

F. ASH CONTENT

The ash content was determined by igniting at 675°C according to DIN 53586.
Several typical examples are given below using the raw materials and test methods described above.

EXAMPLE 1

There was used an apparatus for the production of gas black shown in Ullmann "Enzyklopaedie der technischen Chemie" Vol. 14, Page 799, Illustration 4. The apparatus was tipped with 40 wing burners. The apparatus was charged with a mixture consisting of 15.6 Nm³/h (standard cubic meters/hour) of carrier gas 1 (according to Section B), 8.7 kg/h of vaporized Russoel (according to Section A) and 40.0 Nm³/h of air preheated to about 300°C. The flames burned against the turning, cooled roll. A part of the carbon black formed deposited on the roll.

With the given operating conditions there were formed altogether 1.65 kg/h of Russ FW1 (carbon black FW1) a carbon black of the high color channel class with an electron microscopically ascertained average primary particle diameter of 13 nm (mμ). There were ascertained on the special carbon black produced in Example 1 the following test values:

| | |
|---|---|
| Blackness Value | 185 |
| Oil Requirement | 1030% |
| Ash Content | 0.029% |
| Toluene Extract | 0.290% |

EXAMPLE 2

There was used the same apparatus as in Example 1. It was charged with a mixture of 15.9 Nm³/h carrier gas 2 (see Section B), 8.5 kg/h vaporized Russoel (see Section A), 40.0 Nm³/h air preheated to 300°C.
Also with this composition a typical Russ FW1 (carbon black FW1) was produced. There were formed altogether 1.69 kg/h of this carbon black with the following test values.

| | |
|---|---|
| Blackness Value | 185 |
| Oil Requirement | 1010% |
| Ash Content | 0.023% |
| Toluene Extract | 0.215% |

EXAMPLE 3

The same apparatus as in Example 1 was charged with a mixture of 16.2 Nm³/h of carrier gas 3 (see Section B), 8.5 kg/h vaporized Russoel (see Section A), 42.0 Nm³/h air preheated to 300°C.
Likewise with this mixture there was produced the color black FW1 as defined above. Under the preceding operating conditions there were formed 1.87 kg/h of color black FW1 with the following test data:

| | |
|---|---|
| Blackness value | 185 |
| Oil Requirement | 900% |
| Ash Content | 0.023% |
| Extractable Content | 0.102% |

EXAMPLE 4

In this example there was used exactly the same procedure and charging conditions as described in Example 3. However the carbon black deposited on the rolls was separately collected and investigated separately from the filter carbon black. There resulted an hourly roll carbon black production of 1.29 kg/h. This carbon black had the following test data:

| | |
|---|---|
| Blackness Value | 185 |
| Oil Requirement | 950% |
| Ash Content | 0.026% |
| Toluene Extract | 0.031% |

It can be recognized from Examples 1–4 how the toluene extract can be reduced with the same carbon black quality by carrying out the conversion to the black employing hydrogen rich carrier gas and separate carbon black deposition on the roll.

The extractable content with combined roll and filter carbon black was 0.290% for carrier gas 1 with 48% $H_2$; 0.215% for carrier gas 2 with 59.3% $H_2$; 0.102% for carrier gas 3 with 85% $H_2$ and with the separately recovered roll carbon black 0.031% for carrier gas 3 with 85% $H_2$.

EXAMPLE 5

All of the previous examples were with reference to high color channel gas black quality FW1. Below it is shown that the procedure of Example 2 also applies to gas blacks of the MCC class (medium-color-channel class). A black of this type is color black S 160.

There was injected into the described apparatus a mixture of 14.6 $Nm^3/h$ of carrier gas 3 (see Section B), 10.6 kg/h of vaporized Russoel (see Section A) and 32.1 $Nm^3/h$ of air preheated to 300°C. Thereby there was deposited on the roll and in the filter together 4.41 kg/h of color black S160. S 160 is a color black with an average primary particle size of 20 nm. The tests led to the following data:

| Blackness Value | 160 |
|---|---|
| Oil Requirement | 610% |
| Ash Content | 0.043% |
| Toluene Extract | 0.185% |

In contrast when the roll carbon black was separately collected there were formed 2.60 kg/h of S160 with the following test data:

| Blackness Value | 160 |
|---|---|
| Oil Requirement | 630% |
| Ash Content | 0.035% |
| Toluene Extract | 0.057% |

EXAMPLE 6

Into a continuous screw kneader 320 kg of high density polyethylene Lupolen 2000 H (density 0.919 $g/cm^3$ DIN 53 479, melt flow index 190/2 1,2–1,7 g/10 min DIN 53 735) are fed. After plastification of the material at about 180°C 80 kg/hour of carbon black FW 1 prepared according to example 4 are introduced at a place about 90 cm downstream of the polymer inlet into the plastified resin. After passing the screw kneader the material is extruded and cooled down. The uptake of energy was 0,27 KWh per kg carbon black - polyethylene mixture. The carbon black content during the continuous extrusion remained constant. After dilution with additional Lupolen to 1,2% carbon black by kneading, the mixture was extruded to foils. The foils had very deep dark appearance and a smooth surface. They proofed well suited for different applications in packaging, agriculture and construction work due to their low content of extractable matter.

The aforementioned examples are not intended to limit the invention but only to illustrate it.

The process of the invention is simple, effective and does not require additional industrial expense. It is surprising and also not foreseeable by the experts in the carbon black art. In regard to the purity of the product the process brings about a clear improvement. This improvement also is not impaired by 20–40 % of the carbon black produced (the filter black portion) not being of the desired degree of purity. This portion, namely apart from this, is used mostly for further working up by subsequent oxidation. In this subsequent oxidation the extractable portion is likewise removed. The after oxidized carbon blacks, however, are more suited for addition in lacquer or printing inks, while the carbon blacks produced by the invention have their main area of use in the synthetic resin sector.

Example 5 shows that the process of the invention is also usable for the average depth of color range, provided that this black is produced according to the gas black process.

In place of the coal tar oil used in the working examples, there can be used other conventional black forming sources such as, for example, other coal tar oils, anthracene containing oils, naphthalene, low temperature tar oils from lignite or coal, and olefine cracker products (cracker bottoms).

The process can comprise, consist essentially of or consist of using the conditions and materials set forth.

Other than for the improvement in properties obtained by the action of hydrogen, the composition of carrier gas is essentially less important in the process.

What is claimed is:

1. In a process of preparing carbon black employing a cooling roll, for deposition of carbon black particles by the gas black process employing a carrier gas and vapor of a carbon black forming oil the improvement comprising preparing deeply colored carbon black with low extractable matter content having a primary particle size of about 8 to 25 nm by utilizing as the carrier gas at least about 50 volume % of hydrogen and collecting the carbon black deposited on the cooling roll.

2. The process of claim 1 wherein the hydrogen is about 50 to 85 volume % of the carrier gas.

3. The process of claim 1 wherein the hydrogen is at least about 59 volume % of the carrier gas.

4. The process of claim 1 wherein the hydrogen is at least 70 volume % of the carrier gas.

5. The process of claim 4 wherein the hydrogen is 70 to 85 volume % of the carrier gas.

6. The process of claim 3 wherein the gas black prepared has a toluene extractable content of not over about 0.10%.

7. The process of claim 6 wherein the apparatus for collecting the carbon black formed comprises said roll and a filter and the carbon black deposited on the roll is collected separately from the carbon black in the filter.

8. In a composition comprising a polymer and carbon black as a coloring agent therefor, the improvement comprising employing as the carbon black the carbon black formed in claim 1.

9. In a composition comprising a polymer and carbon black as a coloring agent therefor, the improvement comprising employing as the carbon black the carbon black formed in claim 4.

10. A composition according to claim 9 wherein the polymer is a synthetic resin.

* * * * *